United States Patent
Nakajima

(10) Patent No.: US 10,254,989 B2
(45) Date of Patent: Apr. 9, 2019

(54) METHOD AND APPARATUS OF DATA DEDUPLICATION STORAGE SYSTEM

(71) Applicant: Hitachi, Ltd., Tokyo (JP)

(72) Inventor: Akio Nakajima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 15/117,769

(22) PCT Filed: May 30, 2014

(86) PCT No.: PCT/US2014/040181
§ 371 (c)(1),
(2) Date: Aug. 10, 2016

(87) PCT Pub. No.: WO2015/183302
PCT Pub. Date: Dec. 3, 2015

(65) Prior Publication Data
US 2016/0357477 A1    Dec. 8, 2016

(51) Int. Cl.
*G06F 3/06* (2006.01)
*G06F 12/02* (2006.01)

(52) U.S. Cl.
CPC .......... *G06F 3/0641* (2013.01); *G06F 3/0608* (2013.01); *G06F 3/0616* (2013.01); *G06F 3/0679* (2013.01); *G06F 3/0688* (2013.01); *G06F 12/0246* (2013.01); *G06F 2212/1044* (2013.01); *G06F 2212/7207* (2013.01)

(58) Field of Classification Search
CPC .................. G06F 3/0641; G06F 17/30156
See application file for complete search history.

(56) References Cited

U.S. PATENT DOCUMENTS

| 8,140,821 | B1* | 3/2012 | Raizen ................ G06F 11/1448 707/637 |
| 8,458,145 | B2 | 6/2013 | Kopylovitz et al. |
| 9,183,218 | B1* | 11/2015 | Wallace ............ G06F 17/30156 |
| 2009/0171888 | A1* | 7/2009 | Anglin .............. G06F 17/30073 |

(Continued)

FOREIGN PATENT DOCUMENTS

| JP | 2009-205411 A | 9/2009 |
| JP | 2013-532853 A | 8/2013 |

OTHER PUBLICATIONS

International Search Report of PCT/US2014/040181 dated Oct. 17, 2014.

(Continued)

*Primary Examiner* — Edward J Dudek, Jr.
*Assistant Examiner* — Andrew Russell
(74) *Attorney, Agent, or Firm* — Mattingly & Malur, PC

(57) ABSTRACT

According to one embodiment, a storage system comprises a controller being configured to: receive a write data of an application from a computer; manage the write data as a plurality of data sets, each of the plurality of data sets having a size of a deduplication unit; and apply a deduplication function to each of the plurality of data sets. When a data set of the plurality of data sets has an application metadata portion containing application metadata, the controller separates the application metadata from the data set and fills the application metadata portion by a padding data and applies the deduplication function to the data set including the padding data.

15 Claims, 14 Drawing Sheets

(56) References Cited

U.S. PATENT DOCUMENTS

| | | |
|---|---|---|
| 2009/0216937 A1 | 8/2009 | Yasufuku |
| 2010/0037118 A1 | 2/2010 | Saliba et al. |
| 2010/0161685 A1* | 6/2010 | Jain ................... G06F 3/0641 707/812 |
| 2010/0199065 A1* | 8/2010 | Kaneda ............... G06F 3/0608 711/209 |
| 2011/0161291 A1 | 6/2011 | Taleck et al. |
| 2011/0196848 A1 | 8/2011 | Anglin |
| 2011/0246741 A1 | 10/2011 | Raymond et al. |
| 2012/0102260 A1 | 4/2012 | Kawamura et al. |
| 2012/0137054 A1* | 5/2012 | Sadri .................. G06F 3/0641 711/103 |
| 2012/0191667 A1* | 7/2012 | Kopylovitz .......... G06F 3/0608 707/692 |
| 2013/0013880 A1 | 1/2013 | Tashiro et al. |
| 2013/0151756 A1 | 6/2013 | Tofano |

OTHER PUBLICATIONS

Japanese Office Action received in corresponding Japanese Application No. 2016-554190 dated Aug. 22, 2017.

* cited by examiner

| LUN ~41 | LBA ~42 | Header Length ~43 | Header Location ~44 | Data Hash value ~45 |
|---|---|---|---|---|
| 0000h | 00000000h | 0h | N/A | 00112233 |
| 0000h | 00000001h | 10h | 02330002 | 22334455 |
| 0000h | 00000002h | 10h | 02330003 | 44556677 |
| 0000h | 00000003h | 0h | N/A | aabbccdd |
| ... | ... | ... | ... | ... | hash table 40

FIG. 4

| location table 50 | |
| --- | --- |
| Data Hash value (51) | PBA of sector data body (52) |
| 00112233h | 00001101h |
| 22334455h | 11000100h |
| 44556677h | 20103300h |
| aabbccddh | 00102200h |
| . . . | . . . |

FIG. 5

FIG. 12 hash table 120

| LBA ~121 | Header Length ~122 | Data Hash value ~123 | Header data ~124 |
|---|---|---|---|
| 00000000h | 0h | 00112233 | N/A |
| 00000001h | 10h | 22334455 | header data A |
| 00000002h | 10h | 44556677 | header data B |
| 00000003h | 0h | aabbccdd | N/A |
| ... | ... | ... | ... |

METHOD AND APPARATUS OF DATA DEDUPLICATION STORAGE SYSTEM

BACKGROUND OF THE INVENTION

The present invention relates generally to storage systems and, more particularly, to life management for solid state memory system as applied to data deduplication.

Currently, a solid state memory system such as a flash memory should be managed for write and erase operation, because the flash memory has limitation of duration of life due to erase page operation. Also, data deduplication technology is available.

Current solid state memory system and storage system do not implement data deduplication for application specific data structures. For example, U.S. Patent Application Publication No. 20130151756 discloses that example methods and apparatus concern identifying placement and/or erasure data for a flash memory based solid state device that supports deduplication.

BRIEF SUMMARY OF THE INVENTION

Exemplary embodiments of the invention provide ways for life management for solid state memory system as applied to data deduplication. When a storage system performs a write operation, the storage program checks application specific data pattern and separates application header structure and application data body. The storage program then calculates a fingerprint of data deduplication such as hash value for the application data body, updates the hash value, header length, and header location, and stores the header data and data body separately. The storage system stores separately the application header (which is difficult to data deduplicate part) and data body (which is pattern data such as database application initialized data) to improve the data deduplication ratio.

In accordance with an aspect of the present invention, a storage system comprises a controller being configured to: receive a write data of an application from a computer; manage the write data as a plurality of data sets, each of the plurality of data sets having a size of a deduplication unit; and apply a deduplication function to each of the plurality of data sets. When a data set of the plurality of data sets has an application metadata portion containing application metadata, the controller separates the application metadata from the data set and fills the application metadata portion by a padding data and applies the deduplication function to the data set including the padding data.

In some embodiments, applying the deduplication function to a data set comprises: calculating a hash value of the data set, the data set including the padding data when the data set has the application metadata portion; storing the hash value of the data set in a memory; comparing the calculated hash value with hash values of other data sets stored in the memory; when the calculated hash value does not match hash values of other data sets, storing the data set in the storage system; and when the calculated hash value matches a hash value of another data set, not storing the portion of the write data in the data set in the storage system.

In specific embodiments, when the data set has the application metadata portion, the controller stores the separated application metadata to an application metadata area of the memory. Each hash value is associated with a data set stored in the storage system. For each hash value, the controller stores, in the memory, information of a location of the data set stored in the storage system.

In some embodiments, the controller is configured, in response to a read request to read data stored in the storage system, to: for each data set to be read, determine whether the data set has an application metadata portion; when the data set does not have the application metadata portion, find the hash value of the data set stored in the memory, find the location of the data set stored in the storage system for the found hash value stored in the memory, and read the data set stored in the storage system at the found location; and when the data set has the application metadata portion, read the separated application metadata of the data set from the application metadata area of the memory, find the hash value of the data set stored in the memory, find the location of the data set stored in the storage system for the found hash value stored in the memory, read the data set stored in the storage system at the found location, and concatenate the read application metadata and the read data set.

In specific embodiments, the storage system further comprises a plurality of solid state disk systems to store the data sets. The controller is provided in one of the solid state disk systems.

In accordance with another aspect of the invention, a controller of a storage system is configured to: receive a write data of an application from a computer; manage the write data as a plurality of data sets, each of the plurality of data sets having a size of a deduplication unit; and apply a deduplication function to each of the plurality of data sets. When a data set of the plurality of data sets has an application metadata portion containing application metadata, the controller separates the application metadata from the data set and fills the application metadata portion by a padding data and applies the deduplication function to the data set including the padding data.

Another aspect of this invention is directed to a non-transitory computer-readable storage medium storing a plurality of instructions for controlling a data processor to perform deduplication in a storage system. The plurality of instructions comprise: instructions that cause the data processor to receive a write data of an application from a computer; instructions that cause the data processor to manage the write data as a plurality of data sets, each of the plurality of data sets having a size of a deduplication unit; instructions that cause the data processor to apply a deduplication function to each of the plurality of data sets; and instructions that cause the data processor when a data set of the plurality of data sets has an application metadata portion containing application metadata, to separate the application metadata from the data set and fill the application metadata portion by a padding data and apply the deduplication function to the data set including the padding data.

In some embodiments, the storage system includes a plurality of solid state disk systems to store the data sets. The data processor is provided in one of the solid state disk systems.

These and other features and advantages of the present invention will become apparent to those of ordinary skill in the art in view of the following detailed description of the specific embodiments.

BRIEF DESCRIPTION OF THE DRAWINGS

FIG. 4 shows an example of a hash table according to the first embodiment.

FIG. 5 shows an example of a location table.

FIG. 12 shows an example of a hash table according to the second embodiment.

DETAILED DESCRIPTION OF THE INVENTION

Figure 1:
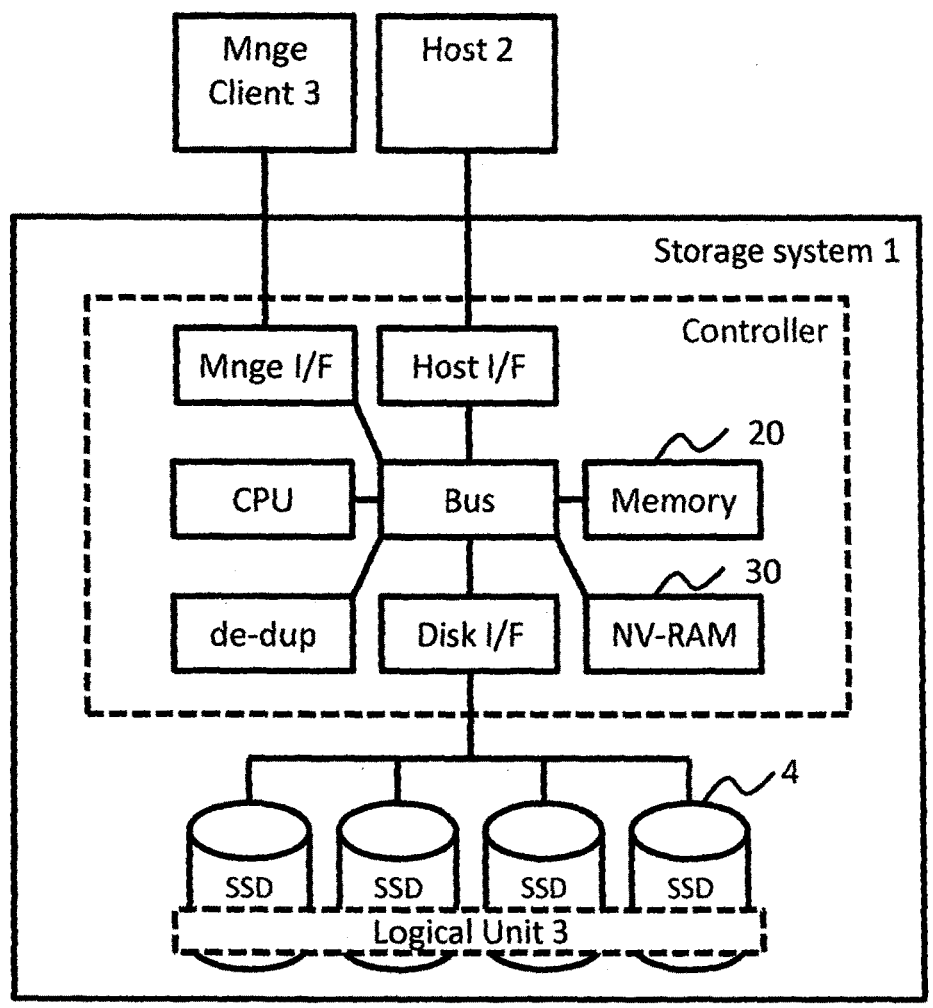
FIG. 1 illustrates an example of a hardware configuration of a system in which the method and apparatus of the invention may be applied according to the first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for life management for solid state memory system as applied to data deduplication.

First Embodiment

FIG. 1 illustrates an example of a hardware configuration of a computer system in which the method and apparatus of the invention may be applied according to the first embodiment. The computer system includes a storage system 1, a host computer 2, and management client 3. The physical storage system 1 includes a host interface which connects to host, CPU, data deduplication engine, storage memory 20, non-volatile random access memory (NV-RAM) 30, Disk interface, and a plurality of SSDs 4, by Bus interface such as PCI, DDR, SCSI. A logical unit (LU) 3 is logical data store which is created by multiple SSDs 4. For example, the SDD 4 is solid state disk that contains flash memory media. NV-RAM 30 is byte access interface such as FRAM (Ferroelectric RAM), M-RAM (Magnetoresistive RAM), or PCM (Phase-change RAM). The controller of the storage system 1 performs the deduplication process.

Figure 2:
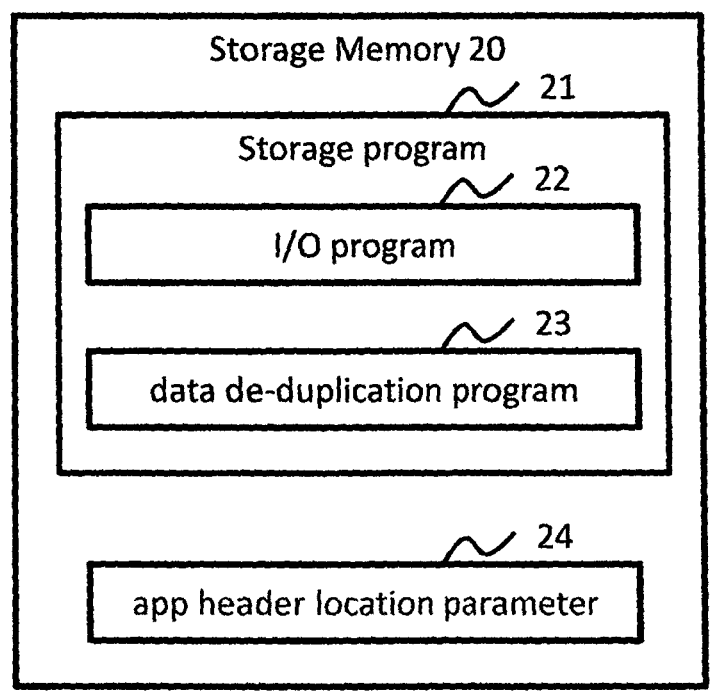
FIG. 2 shows an example of a storage memory.

FIG. 2 shows an example of a storage memory. The storage memory 20 includes storage program 21 and application header location parameter 24. The storage program 21 performs read and write operation, and management of cache memory operation, and so on. In this example, the storage program 21 includes IO program 22 and data deduplication program 23. The data deduplication program 23 performs management of mapping information between LBA and hash value or between hash value and physical block address (PBA) and calculates hash value based on input data. The application header location parameter 24 includes header location and header length as configured by the administrator.

Figure 3:
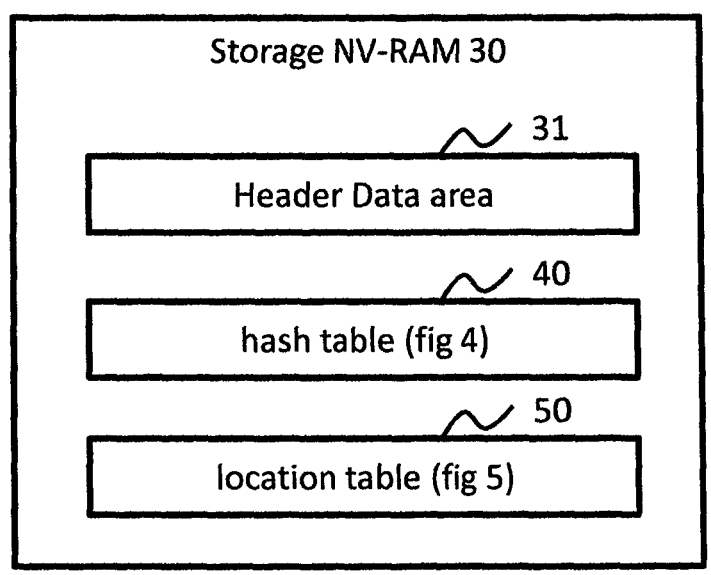
FIG. 3 shows an example of a storage NV-RAM.

FIG. 3 shows an example of a storage NV-RAM. The storage NV-RAM 30 includes header data area 31, hash table 40, and location table 50. The hash table 40 has mapping information between LBA and hash value. The hash table 40 also provides managed location and length of the sector data header. The sector data can be separated into two or more parts of header, body, or footer area. The location table 50 has mapping information between hash value and Physical Block Address (PBA) to manage the location of stored actual sector data. The header data 31, hash table 40, and location table 50 can be stored to battery backed-up storage memory 20. As described in more detail below, deduplication is applied to each sector data (or data set) of a plurality of sector data (or data sets) that form, for example, a write data or a read data. The size of the sector data is determined by a deduplication segment size (i.e., size of a deduplication segment or unit).

FIG. 4 shows an example of a hash table according to the first embodiment. The hash table 40 contains Logical Unit Number (LUN) field 41, Logical Block Address (LBA) field 42, header length field 43, header location 44, and hash value field 45. The LUN field 41 identifies the internal Logical Unit 3 in the storage system 1. The LBA field 42 identifies the address of the LUN. A data segment size of each sector data is a fixed size based on the data deduplication segment size; for example, the data segment size is 4 kB. The header length field 43 and header location 44 are length and store location address of header data. The hash value field 45 is fingerprint of the actual sector data. The storage program calculates the hash value based on the actual sector data to identify the same sector data.

FIG. 5 shows an example of a location table. The location table 50 contains hash value 51 and Physical Block Address (PBA) of sector data body 52. The sector data body (or data set body) is another part of data in which the header data portion is filled using padding pattern data. The hash value field 51 is the same value as the hash value 45 of hash table 40. The PBA of sector data body field 52 identifies the location of the SSD. The PBA field contains disk identifier and LBA of the disk.

Figure 6:
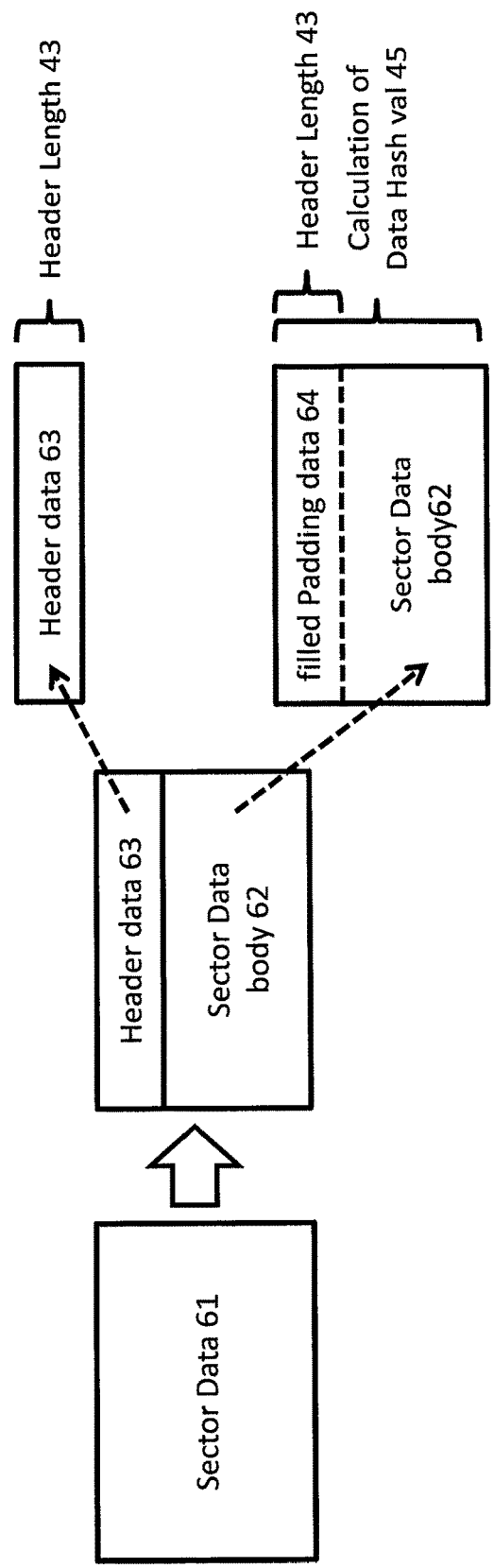
FIG. 6 shows an exemplary overview of the deduplication operation.

FIG. 6 shows an exemplary overview of the deduplication operation. When the storage system receives sector data 61 from the host, the data deduplication program 23 separates the header data 63 and the sector data body 62 based on the header length 43. The header length is chosen by the host application such as a database program, since the database program is stored data with a fixed size header. For example, host the administrator can set the database structure size to a variable length such as 4 kB (1 kB=1024 Bytes) to 32 kB, and the database structure contains fixed size header data such as 32 bytes. The storage administrator knows the database structure size from management client, and the data deduplication program knows the location and size of the database header. Next, the data deduplication program 23 fills padding pattern data 64 to the portion of header data to adjust to the same sector size (such as 512 Bytes) of logical unit 3. Then the data deduplication program 23 stores header data 63 to header data area 31 and stores sector data body 62 with filled padding data 64 to logical unit 3.

Figure 7:
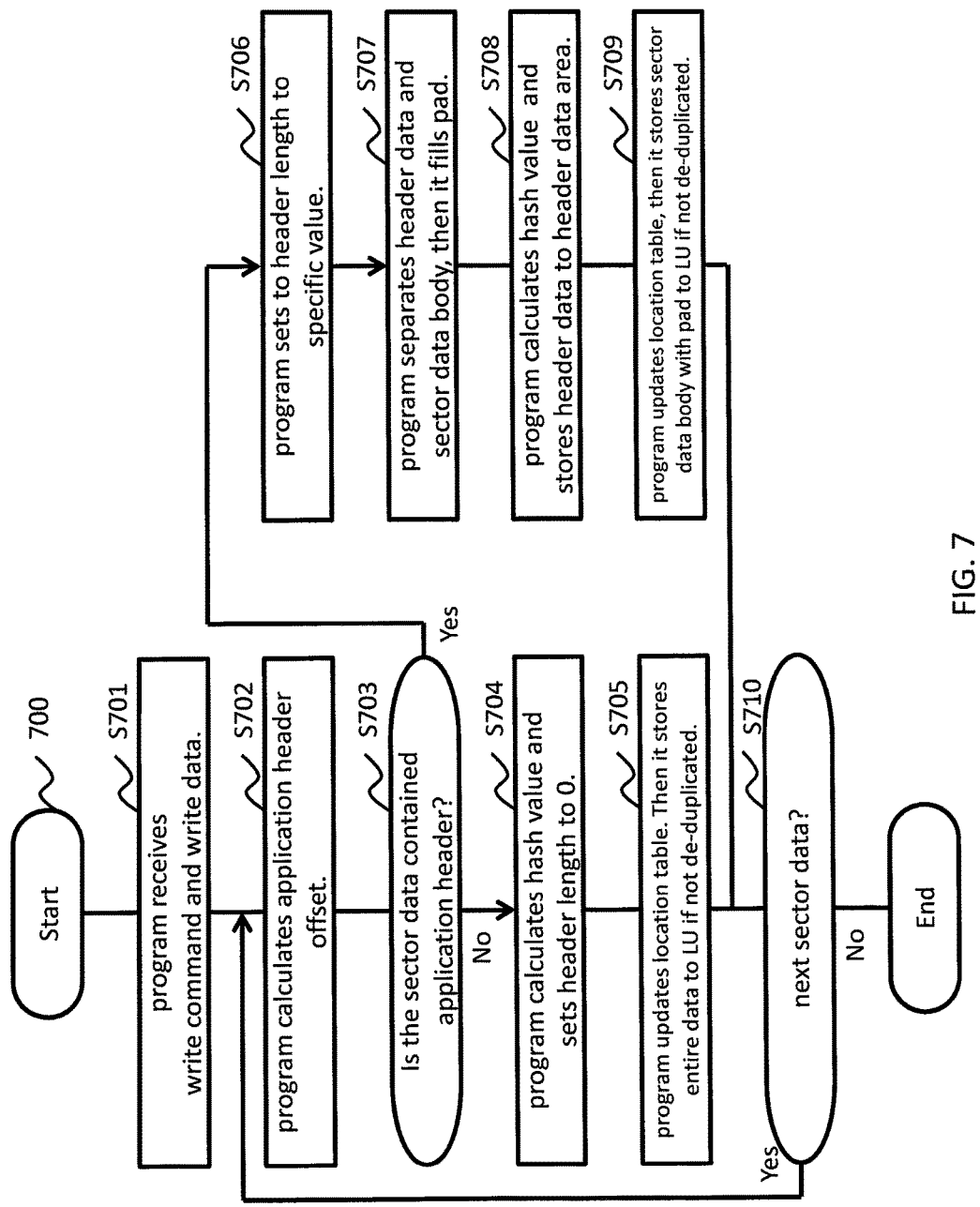
FIG. 7 shows an example of a flow diagram illustrating a process of host write and data deduplication operation.

FIG. 7 shows an example of a flow diagram 700 illustrating a process of host write and data deduplication operation. In step S701, the storage program receives a write command from the host 2. The storage program allocates cache memory and stores received write data, and returns a write response to the host. The storage program divides the write command request size into sector data of the deduplication segment size. This example is a write back operation. A write through operation is similar as the flow diagram shown except for the timing of returning the write response. In step S702, the storage program calculates the host application header offset (length between two application headers). For example, if the host application is a database, the database structure size is 4 kB, multiple of 4 kB of first sector data (512 B) contains database application header data and the other 7 sector data do not contain database application header. In step S703, the program judges whether the sector data contains application header or not. If the sector data contains application header (YES), the next step is S706. If not (NO), the next step is S704.

In step S704, the storage program calculates a hash value and sets the hash value 45 in the hash table 40. The storage program sets the header length field 43 to 0 and the header location field 44 to N/A in the hash table 40. In step S705, the storage program checks the location table 50. If the hash value is not contained in the location table 50, the storage program updates the location table and stores the entire data to PBA of LU 3 (i.e., not deduplicated). If the hash value is contained in the location table 50, the storage program does not store data and does not update location table 50 (i.e., deduplicated).

In step S706, the storage program sets the header length to the specific value from the management clients. In step S707, the storage program separates the header data and sector data body, and the sector data body is filled with padding data of the header length. In step S708, the storage program calculates a hash value of the sector data body and filled padding data, and sets the hash value 45 in the hash table 40. The storage program sets the header length field 43 to the specific value and the header location 44 to store memory address of header data in the hash table 40. In step S709, the storage program checks the location table 50. If the hash value is not contained in the location table 50, the storage program updates the location table and stores the sector data body with padding data to PBA of LU 3. If the hash value is contained in the location table 50, the storage program does not store the sector data body with padding data and does not update the location table 50.

After step S705 or step S709, in step S710, the storage program processes next sector data. If the next sector data exists (YES), the next step is S702. If all sector data are processed (NO), the process ends.

Figure 8:
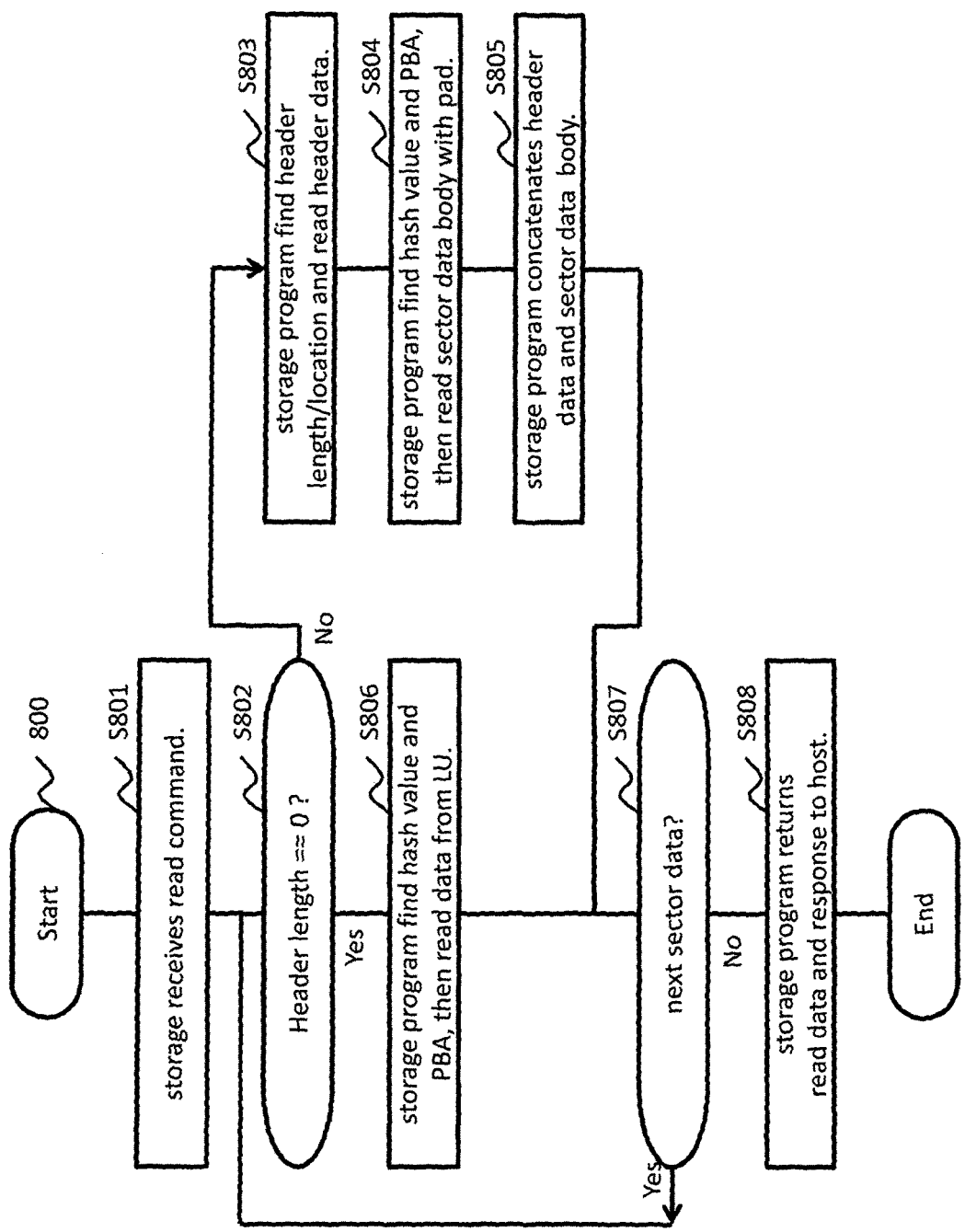
FIG. 8 shows an example of a flow diagram illustrating a process of host read miss operation.

FIG. 8 shows an example of a flow diagram 800 illustrating a process of host read miss operation. The flow diagram shows a read operation of cache miss. The storage program searches the hash table 30 and location table 40 and reads data from the physical media. In step S801, the storage program receives a read command from the host 2. The storage program allocates cache memory and divides the read command request size into parts of the deduplication segment size. In step S802, the storage program checks the hash table 40 and the header length field 43. If the header length is zero (YES), the next step is S806. If not (NO), the next step is S803.

In step S803, the storage program finds the header length 43 and header location 44, and reads header data from the header data area 31. In step S804: The storage program refers hash value 45 based on the LUN and LBA from hash table 40. Then the storage program search PBA 52 from location table 50 based on the hash value 45, and reads sector data body with padding data from LU and stores the header data to cache memory. In step S805, the storage program concatenates the header data and sector data body and stores the concatenated data to cache memory. In step S806, the storage program looks up the hash value 45 based on the LUN and LBA from the hash table 40. The storage program searches the PBA 52 from the location table 50 based on the hash value 45, and reads data from the LU and stores data to the cache memory. In step S807 following step S805 or S806, the storage program processes next sector data. If the next sector data exists (YES), the next step is S802. If all sector data are processed (NO), the next step is S808. In step S808, the storage program returns read data and response to the host.

Figure 9:
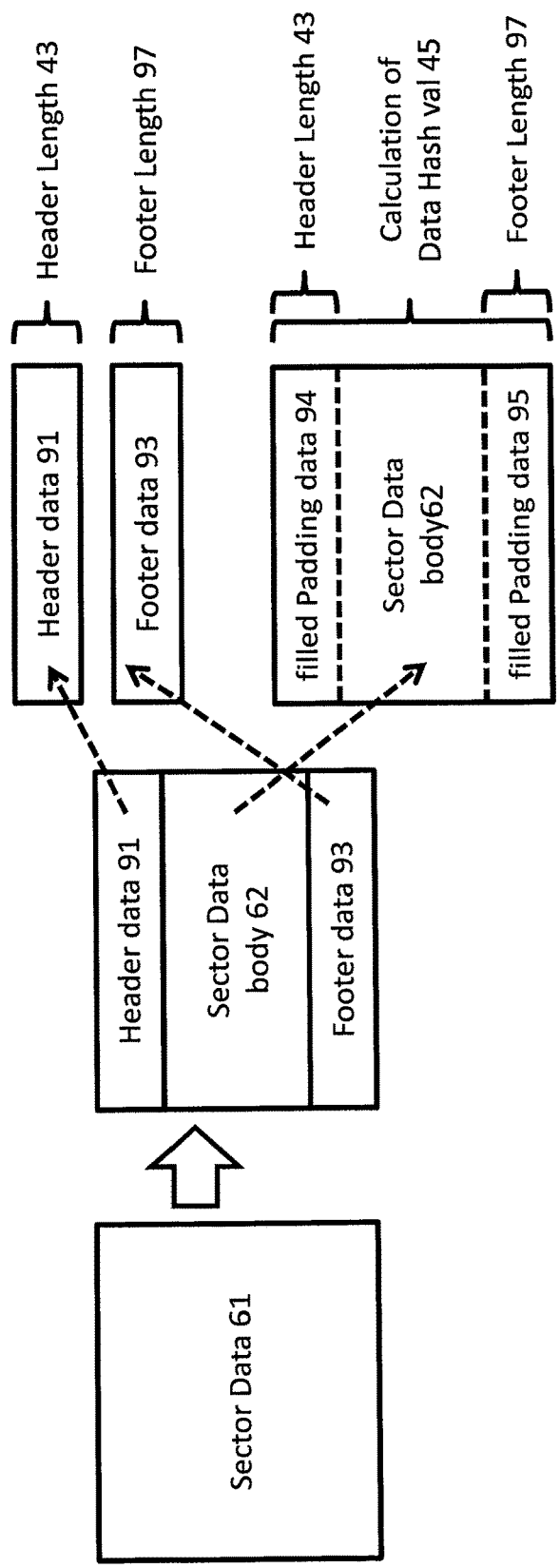
FIG. 9 shows another exemplary overview of the deduplication operation.

FIG. 9 shows another exemplary overview of the deduplication operation. FIG. 9 is similar to FIG. 6, but introduces footer data 93 as well as header data 91 and illustrates header or/and footer separation. When the storage system receives sector data 61 from the host, the data deduplication program 23 separates the header data 91 and footer data 93 from the sector data body 62 based on the header length 43 and the footer length 97. Next, the data deduplication program 23 fills one padding pattern data 94 to the portion of header data having the header length 43 and fills another padding pattern data 95 to the portion of the footer data having the footer length 97 to adjust to the same sector size (such as 512 Bytes) of logical unit 3. Then the data deduplication program 23 stores header data 91 and footer data 93 to header data area 31 and stores sector data body 62 with filled padding data 94, 95 to logical unit 3. Application metadata is provided in the header portion/area as header data and/or in the footer portion/area as footer data and/or some other metadata portion/area of the sector data.

Second Embodiment

Figure 10:
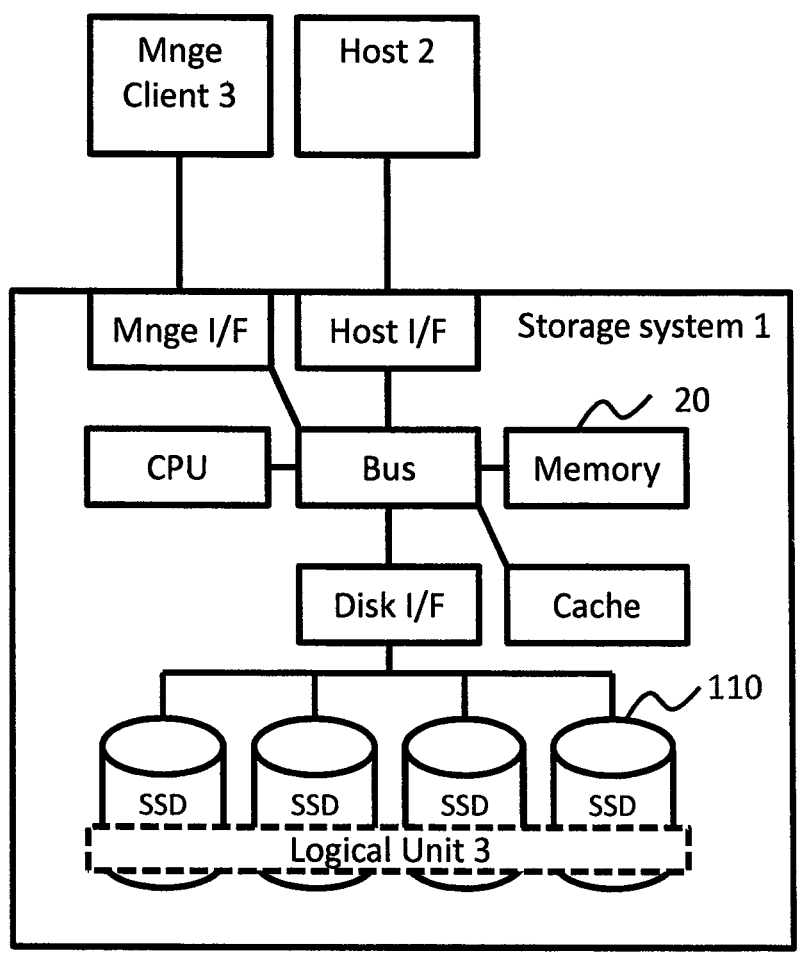
FIG. 10 illustrates an example of a hardware configuration of a system in which the method and apparatus of the invention may be applied according to the second embodiment.

FIG. 10 illustrates an example of a hardware configuration of a system in which the method and apparatus of the invention may be applied according to the second embodiment. FIG. 10 is similar to FIG. 1. In the second embodiment, the deduplication process will be performed by a controller in the SSDs 110 instead of the controller in the storage system 1.

Figure 11:
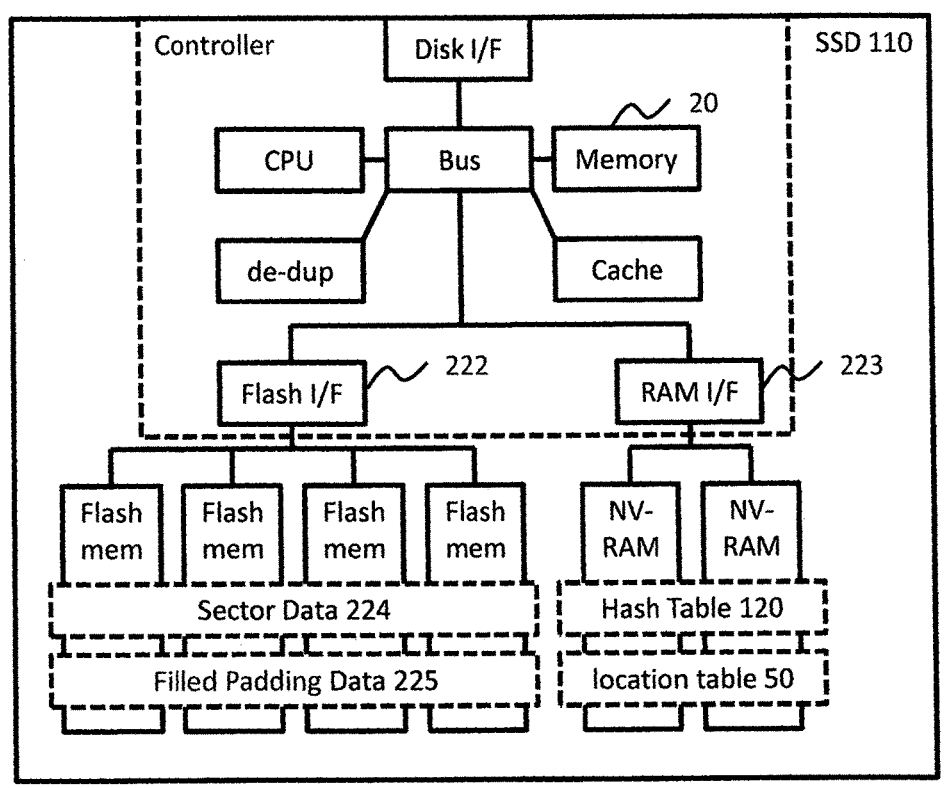
FIG. 11 shows an example of an SSD (solid state disk) system in the second embodiment.

FIG. 11 shows an example of an SSD (solid state disk) system in the second embodiment. The SSD 110 includes a disk interface which connects to CPU, data deduplication engine, memory 20 (see FIG. 2), cache memory, flash interface 222, and RAM I/F 223 via a Bus interface such as PCI, DDR, SCSI, or the like. The flash interface 22 is a block access non-volatile memory interface such as NAND. The I/O access size is typically 2 kB block size, and the NAND flash is typically 256 kB erase sector size. The flash interface 222 connects a plurality of flash memory units. The flash memory units contain sector data 224 and filled padding data 225. The RAM interface 223 is byte access non-volatile random access memory (NV-RAM) interface such as FRAM (Ferroelectric RAM), M-RAM (Magnetoresistive RAM) or PCM (Phase-change RAM). The RAM interface 223 connects a plurality of NV-RAM units. The NV-RAM units contain location table 50 and hash table 120.

FIG. 12 shows an example of a hash table according to the second embodiment. FIG. 12 is similar to FIG. 4. The hash table 120 contains LBA field 121, header length field 122, data hash value field 123, and header data 124. For example, the one entry of the hash table 120 is fixed size such as 64 bytes (LBA 8 bytes, header length 4 bytes, hash value 20 bytes, header data 32 bytes), and then the memory read/write operation alignment is matched.

Figure 13:
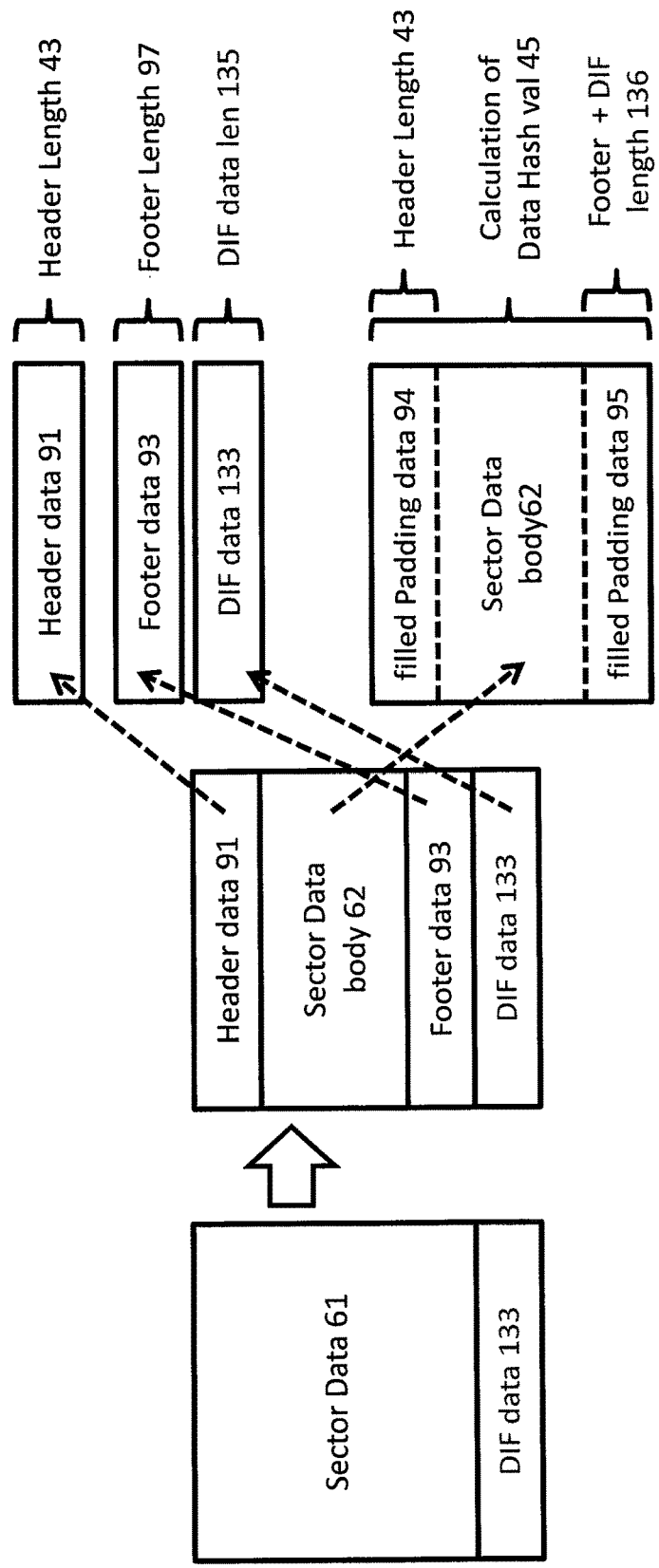
FIG. 13 shows another exemplary overview of the deduplication operation.

FIG. 13 shows another exemplary overview of the deduplication operation with DIF protection. This example is similar to that shown in FIG. 9. In FIG. 13, there is additional storage guard data such as T10 SCSI data integrity field (DIF), shown as DIF data 133. DIF contains tag data (reference tag and application tag) which contains host LBA increment value and application specific tag data and guard data such as CRC (Cycle Redundancy Code) to guard sector data 61. DIF tag data may contain difference value relative to another host LBA sector data. DIF is fixed length specified by T10. To protect the sector data body 62 and header data 91, the DIF data 133 is stored to the header and/or footer data area separately. In the example shown, the storage program stores the sector data body 62 with filled padding data 94 of header length 43 and filled padding data 95 of footer+DIF length 136 (which is equal to footer length 97 plus DIF data length 135) to the logical unit.

Figure 14:
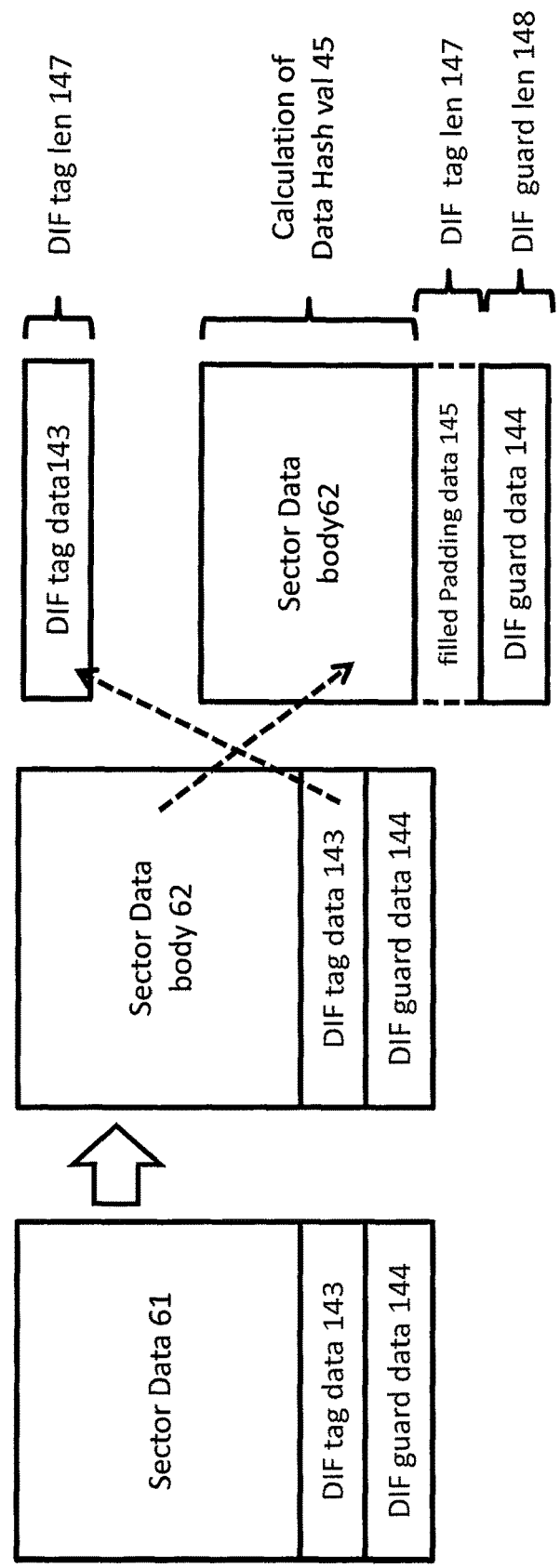
FIG. 14 shows another exemplary overview of the deduplication operation.

FIG. 14 shows another exemplary overview of the deduplication operation with DIF protection. This example is similar that shown in FIG. 13. DIF contains tag data (reference tag and application tag) 143 which contains host LBA increment value and application specific tag data. Also, DIF contains guard data 144 such as CRC (Cycle Redundancy Code) to guard sector data 61. The DIF tag data 143 may contain difference value relative to another host LBA sector data. However, the DIF guard data contains the same value when two sector data are of the same data set, since the DIF guard data 144 is calculated CRC of sector data. The DIF tag data 143 of DIF tag length 147 is stored to the header and/or footer data area and the DIF guard data 144 of DIF guard length 148 is stored with filled padding data 145 of DIF tag length 147 to the logical unit.

In FIG. 13 and FIG. 14, when the storage receives a read command from the host, the storage program performs a similar process as that shown in FIG. 8. In the final step S808, the storage program checks DIF guard data and DIF tag data. If the DIF guard data or DIF tag data is mismatched expected value, the storage returns SCSI check condition response with DIF error for read command.

Of course, the system configurations illustrated in FIGS. 1, 10, and 11 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for life management for solid state memory system as applied to data deduplication. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising a controller being configured to:
    receive a write data of an application from a computer;
    manage the write data as a plurality of data sets, each of the plurality of data sets including a portion of the write data and having a size of a deduplication unit; and
    apply a deduplication function to each of the plurality of data sets;
    wherein when a data set of the plurality of data sets has an application metadata portion containing application metadata, the controller separates the application metadata from the data set and fills the application metadata portion by a padding data and applies the deduplication function which determines a duplication by using a hash value calculated from the data set including the padding data;
    wherein the data set has the size of the deduplication unit at a time before the controller separates the application metadata from the data set, and has the same size of the deduplication unit at a time after the controller separates the application metadata from the data set and fills the application metadata portion by the padding data.

2. The storage system according to claim 1, wherein applying the deduplication function to a data set comprises:
    calculating a hash value of the data set, the data set including the padding data when the data set has the application metadata portion;
    storing the hash value of the data set in a memory;
    comparing the calculated hash value with hash values of other data sets stored in the memory;
    when the calculated hash value does not match hash values of other data sets, storing the data set in the storage system; and
    when the calculated hash value matches a hash value of another data set, not storing the portion of the write data in the data set in the storage system.

3. The storage system according to claim 2,
    wherein when the data set has the application metadata portion, the controller stores the separated application metadata to an application metadata area of the memory;
    wherein each hash value is associated with a data set stored in the storage system; and
    wherein for each hash value, the controller stores, in the memory, information of a location of the data set stored in the storage system.

4. The storage system according to claim 3, wherein the controller is configured, in response to a read request to read data stored in the storage system, to:
    for each data set to be read, determine whether the data set has an application metadata portion;
    when the data set does not have the application metadata portion, find the hash value of the data set stored in the memory, find the location of the data set stored in the storage system for the found hash value stored in the memory, and read the data set stored in the storage system at the found location; and
    when the data set has the application metadata portion, read the separated application metadata of the data set from the application metadata area of the memory, find the hash value of the data set stored in the memory, find the location of the data set stored in the storage system for the found hash value stored in the memory, read the data set stored in the storage system at the found location, and concatenate the read application metadata and the read data set.

5. The storage system according to claim 1, further comprising:
    a plurality of solid state disk systems to store the data sets; and
    wherein the controller is provided in one of the solid state disk systems.

6. A controller of a storage system, the controller being configured to:
    receive a write data of an application from a computer;
    manage the write data as a plurality of data sets, each of the plurality of data sets including a portion of the write data and having a size of a deduplication unit; and
    apply a deduplication function to each of the plurality of data sets;

wherein when a data set of the plurality of data sets has an application metadata portion containing application metadata, the controller separates the application metadata from the data set and fills the application metadata portion by a padding data and applies the deduplication function which determines a duplication by using a hash value calculated from the data set including the padding data;

wherein the data set has the size of the deduplication unit at a time before the controller separates the application metadata from the data set, and has the same size of the deduplication unit at a time after the controller separates the application metadata from the data set and fills the application metadata portion by the padding data.

7. The controller according to claim 6, wherein applying the deduplication function to a data set comprises:

calculating a hash value of the data set, the data set including the padding data when the data set has the application metadata portion;

storing the hash value of the data set in a memory;

comparing the calculated hash value with hash values of other data sets stored in the memory;

when the calculated hash value does not match hash values of other data sets, storing the data set in the storage system; and when the calculated hash value matches a hash value of another data set, not storing the portion of the write data in the data set in the storage system.

8. The controller according to claim 7, wherein when the data set has the application metadata portion, the controller stores the separated application metadata to an application metadata area of the memory;

wherein each hash value is associated with a data set stored in the storage system; and wherein for each hash value, the controller stores, in the memory, information of a location of the data set stored in the storage system.

9. The controller according to claim 8, wherein the controller is configured, in response to a read request to read data stored in the storage system, to:

for each data set to be read, determine whether the data set has an application metadata portion;

when the data set does not have the application metadata portion, find the hash value of the data set stored in the memory, find the location of the data set stored in the storage system for the found hash value stored in the memory, and read the data set stored in the storage system at the found location;

when the data set has the application metadata portion, read the separated application metadata of the data set from the application metadata area of the memory, find the hash value of the data set stored in the memory, find the location of the data set stored in the storage system for the found hash value stored in the memory, read the data set stored in the storage system at the found location, and concatenate the read application metadata and the read data set.

10. The controller according to claim 6, wherein the controller is provided in one of a plurality of solid state disk systems of the storage system for storing data sets.

11. A non-transitory computer-readable storage medium storing a plurality of instructions for controlling a data processor to perform deduplication in a storage system, the plurality of instructions comprising:

instructions that cause the data processor to receive a write data of an application from a computer;

instructions that cause the data processor to manage the write data as a plurality of data sets, each of the plurality of data sets including a portion of the write data and having a size of a deduplication unit;

instructions that cause the data processor to apply a deduplication function to each of the plurality of data sets; and instructions that cause the data processor when a data set of the plurality of data sets has an application metadata portion containing application metadata, to separate the application metadata from the data set and fill the application metadata portion by a padding data and apply the deduplication function which determines a duplication by using a hash value calculated from the data set including the padding data;

wherein the data set has the size of the deduplication unit at a time before the data processor separates the application metadata from the data set, and has the same size of the deduplication unit at a time after the data processor separates the application metadata from the data set and fills the application metadata portion by the padding data.

12. The non-transitory computer-readable storage medium according to claim 11, wherein the instructions that cause the data processor to apply the deduplication function to a data set comprises:

instructions that cause the data processor to calculate a hash value of the data set, the data set including the padding data when the data set has the application metadata portion;

instructions that cause the data processor to store the hash value of the data set in a memory;

instructions that cause the data processor to compare the calculated hash value with hash values of other data sets stored in the memory;

instructions that cause the data processor, when the calculated hash value does not match hash values of other data sets, to store the data set in the storage system; and instructions that cause the data processor, when the calculated hash value matches a hash value of another data set, to not store the portion of the write data in the data set in the storage system.

13. The non-transitory computer-readable storage medium according to claim 12, wherein each hash value is associated with a data set stored in the storage system, and wherein the plurality of instructions further comprise:

instructions that cause the data processor, when the data set has the application metadata portion, to store the separated application metadata to an application metadata area of the memory;

instructions that cause the data processor to store in the memory, for each hash value, information of a location of the data set stored in the storage system.

14. The non-transitory computer-readable storage medium according to claim 13, wherein the plurality of instructions further comprise, in response to a read request to read data stored in the storage system:

instructions that cause the data processor, for each data set to be read, to determine whether the data set has an application metadata portion;

instructions that cause the data processor, when the data set does not have the application metadata portion, to find the hash value of the data set stored in the memory, find the location of the data set stored in the storage system for the found hash value stored in the memory, and read the data set stored in the storage system at the found location;

instructions that cause the data processor, when the data set has the application metadata portion, to read the separated application metadata of the data set from the application metadata area of the memory, find the hash value of the data set stored in the memory, find the location of the data set stored in the storage system for the found hash value stored in the memory, read the data set stored in the storage system at the found location, and concatenate the read application metadata and the read data set.

15. The non-transitory computer-readable storage medium according to claim 11, wherein the storage system includes a plurality of solid state disk systems to store the data sets; and wherein the data processor is provided in one of the solid state disk systems.

* * * * *